(No Model.)
R. J. WENTZ.
SEED PLANTER.
No. 344,887. Patented July 6, 1886.
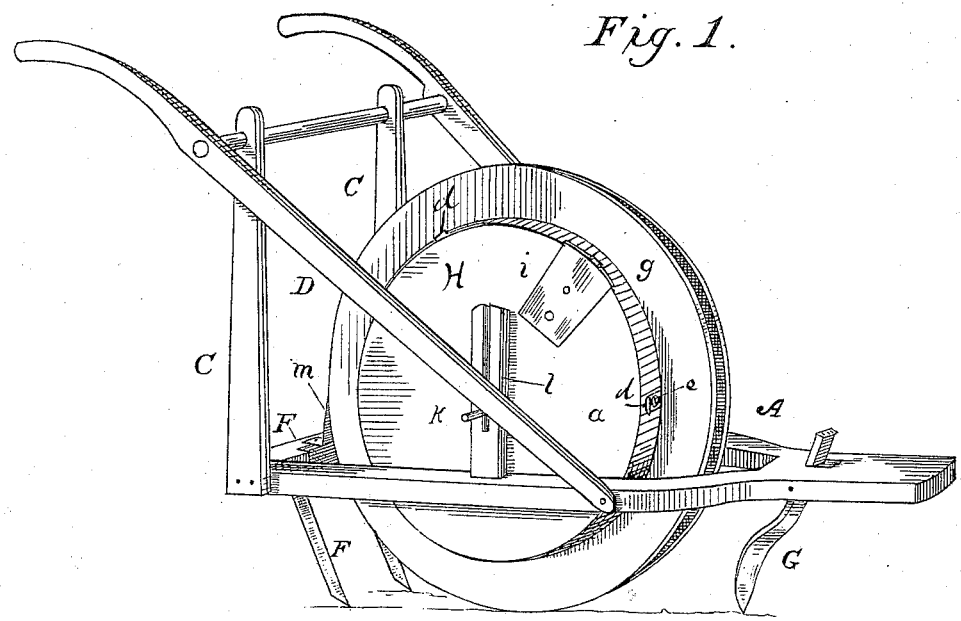
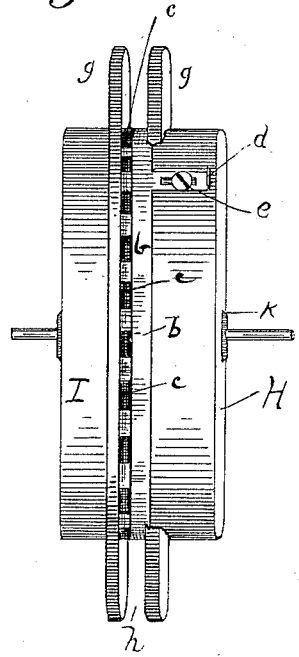 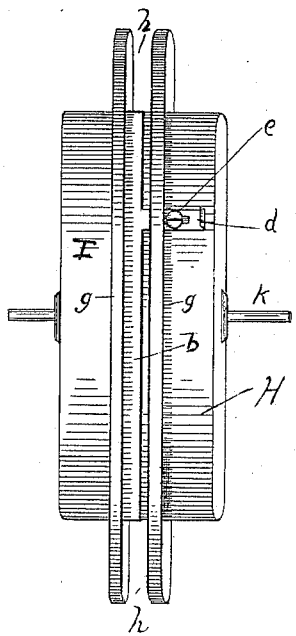
WITNESSES
Jas L Falbey
C. H. Sheen
INVENTOR
Rufus J. Wentz
H. J. Tunis Attorney

UNITED STATES PATENT OFFICE.

RUFUS J. WENTZ, OF STEVENS, NORTH CAROLINA.

SEED-PLANTER.

SPECIFICATION forming part of Letters Patent No. 344,887, dated July 6, 1886.

Application filed June 20, 1884. Serial No. 135,527. (No model.)

*To all whom it may concern:*

Be it known that I, RUFUS JOSIAH WENTZ, a citizen of the United States, residing at Stevens, in the county of Union and State of North Carolina, have invented certain new and useful Improvements in Seed-Planters, of which the following is a specification, reference being had therein to the accompanying drawings.

This invention relates to certain improvements in seed-planters; and it consists in certain combinations and arrangements of the parts, as will be more fully hereinafter set forth, and specifically pointed out in the claim.

In the drawings, Figure 1 represents a perspective view of my improved seed-planter; Fig. 2, a detached front view of the seeding-drum with a portion cut away, and Fig. 3 a similar view of the seeding-drum entire.

The letter A indicates the frame of my improved seeder, which is bifurcated, as shown, for the reception of the drum H. The said frame at the rear is provided with standards C, forming supports for the handles D, which are attached to the sides of the frame. The frame at the rear is provided with a cross-beam, E, which has depending shovels F, and the frame at the front is provided with a plow-share, G.

The seed-drum H is provided with a sheet-metal periphery, I, having a circumferential series of openings or slots, $c$; and $b$ is a circular band or valve sliding over said slots, so as to increase or diminish their size, whereby different kinds of seed and grain may be planted and a greater or less quantity of the same kind of seed discharged. This band or valve $b$ is adjusted by means of its tongues $d$ passing through or beneath one of the flanges and the screws $e$. In Fig. 2 the valve is shown open and in Fig. 3 closed. The periphery of each part of the drum is provided with an annular flange, $g$, the flanges being so arranged relatively as to leave a space, $h$, between them for the passage of the seed. The drum is provided with an opening and sliding door, $i$, at one side for the introduction of seed. Through the drum passes a central shaft or axle, $k$, the journals of which set and have their bearings in the slotted standards $l$, at each side of the carriage.

The letter $m$ indicates a scraper secured to the rear cross-beam, and extending into the space between the flanges on the drum.

The operation of my invention will be readily understood from the above without further explanation.

Having thus described my invention, what I claim, and desire to secure by Letters Patent, is—

In a seed-planter, the drum H, having its periphery provided with slots $c$ $c$ and annular flanges $g$ $g$, in combination with the circumferential valve $b$, adjustably secured between the flanges by means of the slotted integral tongues $d$ and screws $e$, as and for the purpose set forth.

In testimony whereof I affix my signature in presence of two witnesses.

RUFUS J. WENTZ.

Witnesses:
R. L. STEWART,
J. D. FAULKNER.